March 6, 1962

E. A. GUSTAFSON 3,023,561

SIDE-MOUNTED MOWER

Filed March 20, 1959

EDWIN A. GUSTAFSON.
INVENTOR.

BY Eugene C. Knoblock
ATTORNEY

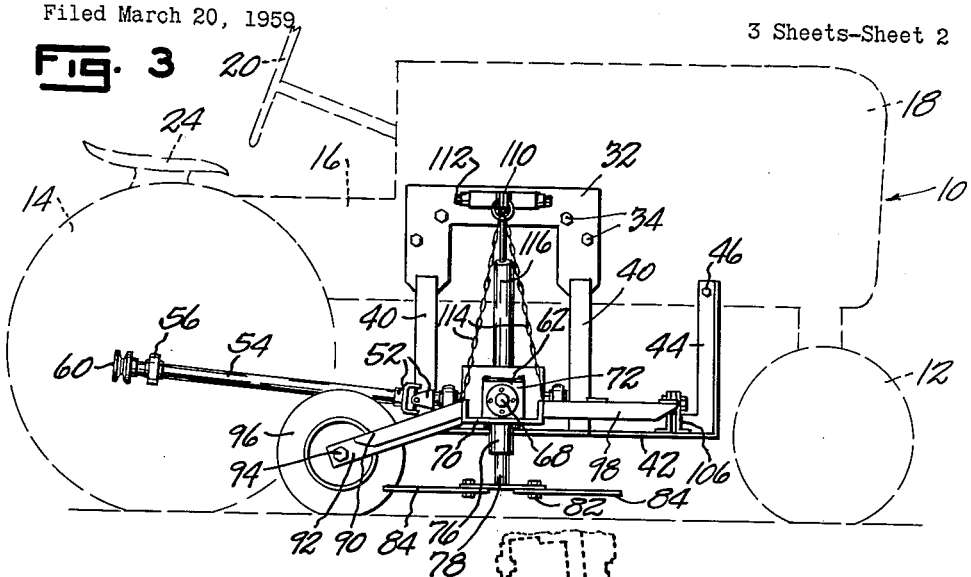

March 6, 1962 E. A. GUSTAFSON 3,023,561
SIDE-MOUNTED MOWER
Filed March 20, 1959 3 Sheets-Sheet 3
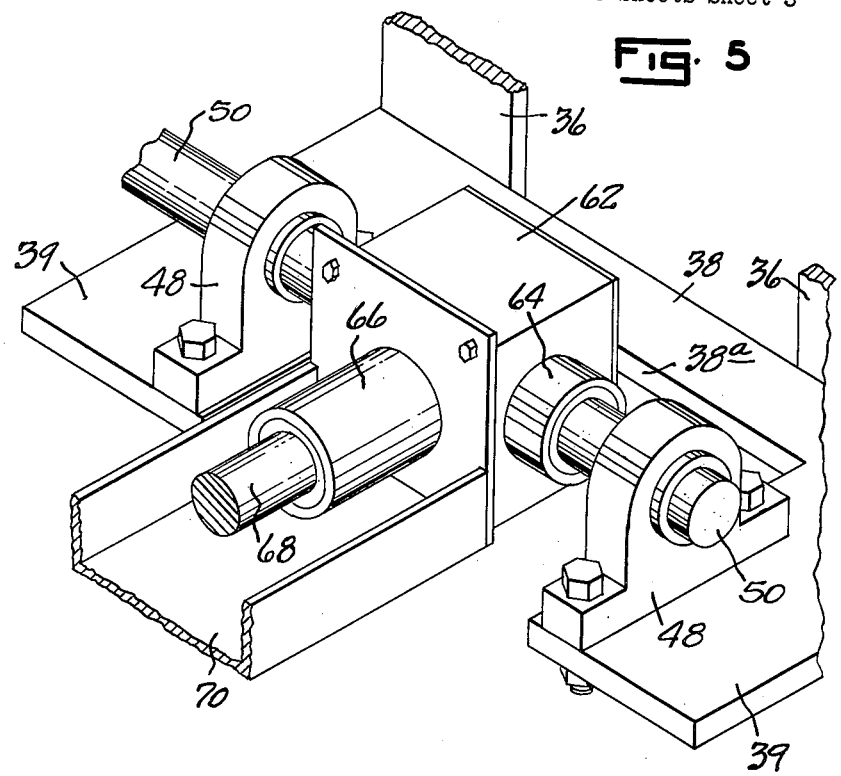
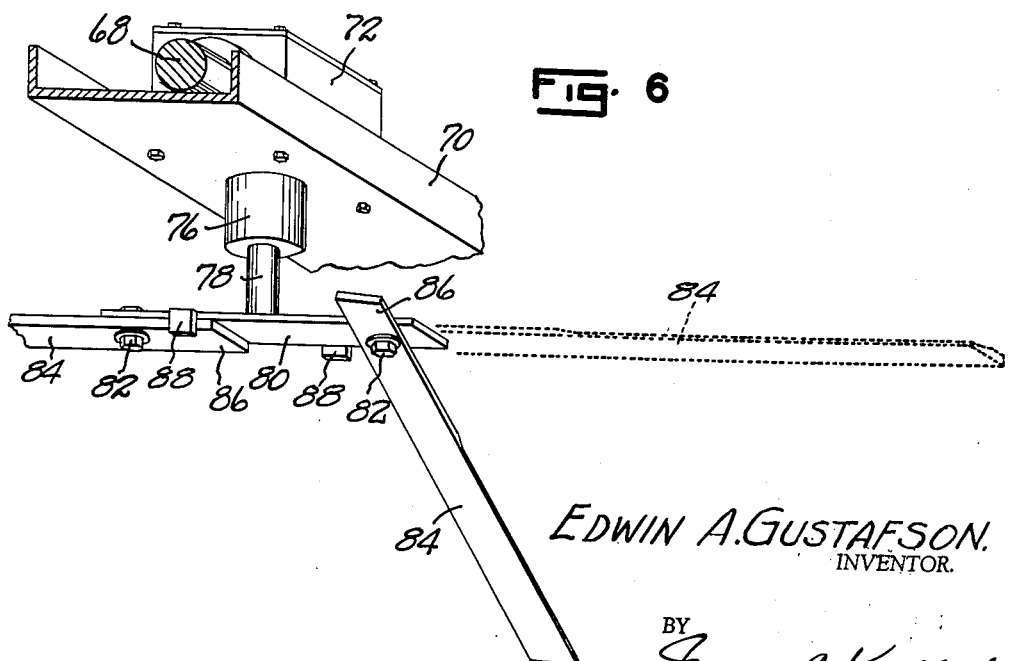
EDWIN A. GUSTAFSON.
INVENTOR.
BY
Eugene C. Knoblock
ATTORNEY

United States Patent Office 3,023,561
Patented Mar. 6, 1962

3,023,561
SIDE-MOUNTED MOWER
Edwin A. Gustafson, 1706 Hadley St., Bessemer, Mich., assignor of one-third to John W. Bretall, and one-third to Leonard Mayer, both of Bessemer, Mich.
Filed Mar. 20, 1959, Ser. No. 800,688
4 Claims. (Cl. 56—25.4)

This invention relates to improvements in side-mounted mowers, and more particularly to a rotary mower adapted to be mounted upon a tractive vehicle and positioned at at the side thereof.

The primary object of this invention is to provide a novel, simple, rugged mower adapted to be mounted upon an agricultural tractor to project from the side thereof between the front and rear wheels and in a position to be within the view of the operator of the vehicle.

A further object is to provide a mower attachment which is pivotally mounted on a vehicle to swing to follow the contour of the earth and which has a novel drive transmission in which the operating parts thereof are so balanced as to operate substantially free of vibration in all operating positions.

A further object is to provide a vertically shiftable pivoted or hinged power-driven cutter unit in which a part of the power-transmission provides a part of the hinge and makes possible uniformly smooth power transmission in all angular adjustments of the cutter unit.

A further object is to provide a mower of this character having a cantilevered mower blade supporting bar pivoted to a frame and provided with a ground wheel adapted to support the same and power-actuated means for controlling the angular position of said bar, together with reinforcing means pivoted to the frame and connected to the bar to sustain the impact of obstacles struck by the free outer end of the bar.

A further object is to provide a mower of this character having a novel mower or cutting unit including a rotatable central portion to which blade portions are pivotally connected to be normally positioned in cutting relation by centrifugal force and being freely yieldable or pivoted in the event the blades strike an obstacle which cannot be sheared.

A further object is to provide a mower of this character which has a wide range of operating positions from a substantially vertical position for cutting brush or branches overhanging a roadway to a position inclined downwardly and outwardly from horizontal position to cut weeds and brush along the berm of a road inclined downwardly from the road.

Other objects will be apparent from the following specification.

In the drawing:

FIG. 3 is a side view of the device illustrating a mounting tractor in dotted lines;

FIG. 4 is a front view of the device illustrating the same in elevated substantially vertical position in dotted lines;

FIG. 5 is an enlarged fragmentary detail perspective view illustrating part of the drive mechanism of the device; and FIG. 6 is an enlarged fragmentary detail perspective view illustrating a cutter used with the device.

Figure 1:
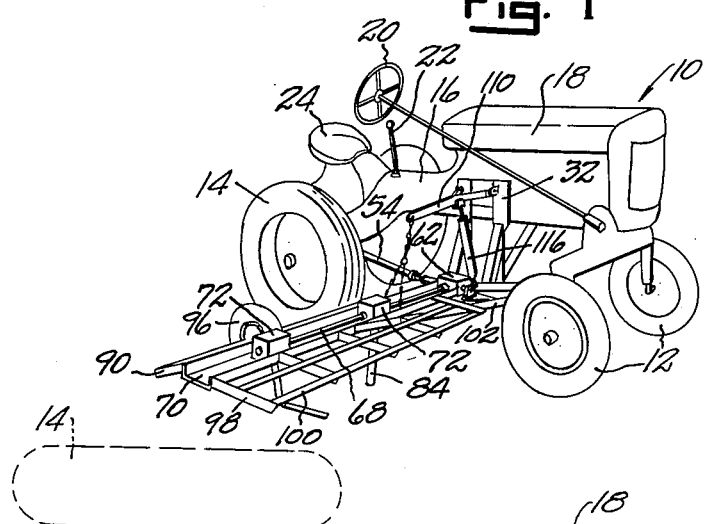
FIG. 1 is a perspective view on a reduced scale of the device mounted upon a tractor.

Referring to the drawings which illustrate a preferred embodiment of the invention, the numeral 10 designates a tractor or other vehicle having front wheels 12, rear wheels 14, and a chassis or frame 16 supporting an internal combustion engine 18. The vehicle will be provided with the usual controls, such as steering wheel 20, and a gear shift mechanism 22, all of which are readily accessible to a driver seated upon a seat 24 which usually is mounted at the rear of the chassis 16 as between rear wheels 14. Suitable drive transmission means (not shown) driven by the internal combustion engine 18 serves to drive the rear wheels 14 or other driving wheels of the vehicle and to operate other power driven parts or power take-off means, including a power take-off shaft 26 positioned at the rear of the chassis and a pump (not shown) of a fluid pressure system. Power take-off shaft 26 will preferably mount a drive means 28, such as a sprocket or pulley for actuation of a drive transmission member 30, such as a chain or belt.

Figure 2:
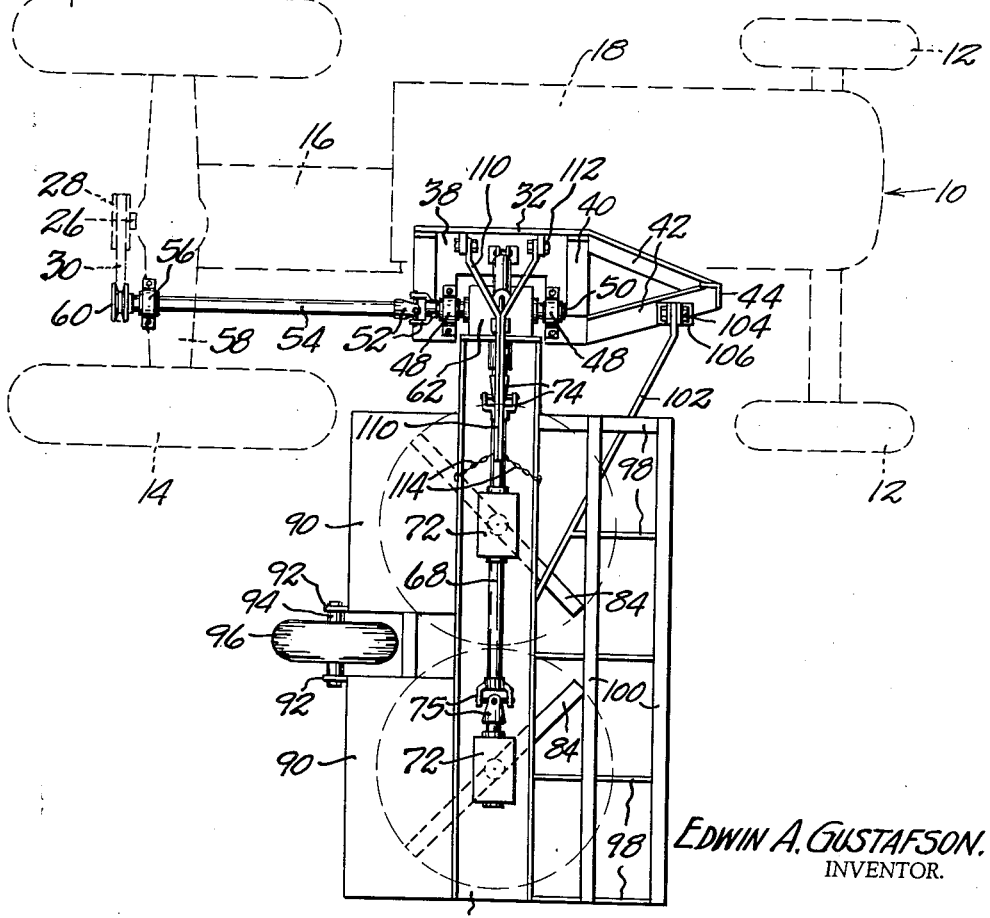
FIG. 2 is a top plan view of the device illustrating its attachment and relation to the tractor or other vehicle in dotted lines.

A rigid support or frame is secured to the tractor chassis or engine block at one side thereof forwardly of the rear wheels and rearwardly of the front wheels, as illustrated in FIGS. 1 to 4. This supporting frame preferably includes a plate portion 32 suitably secured to the tractor, as by means of cap screws 34, and from which a pair of rigid members 36 depend in longitudinally spaced relation. The upright members 36 support a substantially horizontal laterally outwardly projecting plate portion 38 at their lower end. Diagonal or inclined braces 40 extend between the outer marginal portion of the plate 38 and the intermediate portion of the frame unit 32, 36. Longitudinal frame projections 42 are connected to the forward end of the plate 38 and preferably extend in converging relation for interconnection with an upright portion 44 which is anchored to the chassis or motor frame forwardly of the bracket portion 32, as by cap screw 46.

The horizontal plate 38 of the supporting bracket is preferably formed in substantially U-shape to provide a pair of longitudinally spaced laterally projecting arm portions 39 fore and aft of cut-away portion 38a in said plate outlining the same in U-form. The fore and aft parts 39 mount bearings or pillow block members 48 in axial alignment to journal a drive shaft 50 substantially parallel to the longitudinal axis of the chassis 16. The shaft 50 is connected by means of a universal joint 52 with a shaft 54 extending rearwardly and preferably having its rear end portion journaled in a bearing 56 carried by the housing 58 of the axle of the rear wheels 14. The rear end of the shaft 54 mounts a drive transmission member 60, such as a sprocket or pulley cooperating with the drive transmission member 30 driven by the power take-off shaft 26.

A gear box 62 has aligned apertures provided with bearings or bushings 64 which accommodate journaling and support thereof upon the shaft 50 at the cut-away 38a. Gear box 62 is also provided with a bearing or sleeve 66 preferably extending at right angles to the bearing sleeve 64 and serving to journal a shaft 68 extending at right angles to the shaft 50. The gear box 62 will preferably house bevel gears carried by the respective shafts 50 and 68 and meshing to provide a driving connection between said shafts.

An elongated rigid structural member or bar 70, such as a channel member as here illustrated, is mounted or otherwise fixedly secured at one end thereof to the gear box 62, so as to constitute a cantilevered member. The channel 70 is preferably positioned with its flanges extending upwardly and may be of any selected length. One or more gear boxes 72, preferably two as here shown, are mounted upon the channel 70 at selected position or positions intermediate the length thereof and are provided with suitable aligned bushings or bearings in which the shaft 68 is journaled. Preferably, the shaft 68 is formed in multiple sections, there being a universal joint 74 interposed in said shaft assembly between the gear box 62 and the adjacent gear box 72, and there being a universal joint 75 connected in said shaft assembly intermediate the gear boxes 72 in the event two or more gear boxes 72 are provided. Each gear box 72 has a bushing portion 76 substantially perpendicular to shaft 68 which journals a cutter shaft 78. Each gear box 72 contains gears, such as bevel gears (not shown) carried by the respective shafts 68 and 78 and meshing to provide a driving connection between said shafts.

The lower or free end of each cutter shaft 78 carries a cross-arm or central cutter part 80 in balanced relation upon the shaft. Each cross-arm 80 mounts in symmetrical balanced relation, as at diametrically opposed points of the opposite ends thereof, a pair of pivot members 82 equispaced from shaft 78 to pivotally support the inner end portions of elongated blade members 84. Pivots 82 are spaced from the inner ends of said blade members to provide inward projecting blade portions 86. Lugs or other abutment members 88 are carried by the opposite ends of the cross-members 80 at opposite side edges thereof whereby each may be engaged by one edge of an inner end portion 86 of an elongated blade 84. Each abutment 88 is positioned at a trailing edge of the member 80 so that the blades are free to swing and yield in the event the leading edges thereof located outwardly of the pivots 82 strike unyielding abutments. The blades 84 normally respond to centrifugal force and extend in substantially radial position when rotated at operating speeds.

One or more shields or plates 90 project rearwardly from the trailing edge of the transverse projecting bar 70 to overlie the rear portions of the blades 84. The plates 90 are preferably rigid and are preferably spaced apart longitudinally of bar 70, and the adjacent or inner portions of plates 90 are preferably provided with arms or brackets 92 adapted to support an axle 94 for a ground wheel 96 located between adjacent plates 90. An open framework, which preferably consists of a plurality of longitudinally extending members 98 and transversely extending members 100, is supported by the transverse bar 70 and projects forwardly thereof above the cutting blades 84. A diagonally extending elongated rigid brace 102 is secured at its outer end to an intermediate portion of the bar 70 and is pivoted at its inner end at 104 to a bracket 106 carried by the forward frame projections 42. The pivot of brace 102 is substantially axially aligned with the shaft 50.

Lever 110 is pivoted at one end at 112, on an axis substantially parallel to shaft 50, to the upper central part of the frame 32 in substantially centered relation to and spaced above the elongated pivoted bar 70 to extend substantially parallel thereto in the normal or horizontal position of the parts, as illustrated in FIG. 4. Suspension members 114, such as chains or cables, are connected to the free or outer end of the lever 110 and to the pivoted bar 70 spaced from its pivot axis. Power operated means connected to a power take-off means on the vehicle are provided to swing the lever 110. As here illustrated, a cylinder 116 is pivoted at one end at 118 to a bracket supported by the frame member 38. The cylinder contains a piston (not shown) whose piston rod 120 projects from the upper end thereof and is pivotally connected at 122 to an intermediate part of the lever 110. A suitable fluid pressure line with valve control (not shown) extends to a pump (not shown) mounted upon the vehicle 10.

The power operated member 116 provides means for adjusting the angular position or inclination of the swinging cutter mounting bar 70 through a range of at least 90 degrees. Thus the member can swing to substantially vertical position, as illustrated in dotted lines in FIG. 4, and can be lowered to a position inclined downwardly and outwardly from its mounting and below the position shown in full lines in FIG. 4. The mounting of the bar 70 upon the gear box 62, which is supported solely by the shaft 50 journaled in the bearings 48, accommodates this wide range of angular adjustment of the bar 70 while the operating shafts 50 and 68 of the device are rotating to drive the cutter blades 84. Thus there is no limitation upon the rotation of the mower blades with respect to the operating position of the device. This insures that the mower may be used on terrain of various contours extending at different inclinations relative to a roadway both above and below the level of the roadway upon which the vehicle travels. It will be apparent that it is also possible to operate the device in the substantially upright position illustrated in dotted lines in FIG. 4 for the purpose of cutting at low levels the branches of bushes and trees growing close to or overhanging a roadway.

The arrangement of the parts of the drive transmission, including the use of the fixedly mounted bearings 48 for journaling the shaft 50, the journaling of gear box 62 on the shaft 50, the gear drive by the gear box 62 between shaft 50 and the shaft 68, the mounting of the gear boxes 72 driven by shaft 68 upon the bar 70 to drive the cutter shafts 78, and the mounting of bar 70 on gear box 62, insures that the rotation of the driven parts of the device will be substantially free of vibration in all operative positions. This condition, of course, assumes that the individual cutter units 80, 82, 84 will be balanced dynamically.

The pivotal mounting of the mower blades 84, which rely upon the centrifugal force of operation thereof to maintain an extended or radial cutting position, has the advantage of permitting folding or yielding of blades 84 by pivotal movement in the event the outer cutting edges of the blades 84 strike a rock or other obstacle. This pivotal movement serves to minimize the damage to each individual blade. Furthermore, the pivotal mounting thereof renders the blade portions 84 readily removable and replaceable. The abutments 88 serve as means to limit the swinging movement of a blade 84 after it strikes an object so that it cannot swing into contact with another blade 84. The stops 88 also serve as means to prevent the blades 84 from contacting each other when the drive mechanism of the device is not operating.

The pivoted carrier mounting bar 70 and the rearwardly projecting plates 90 carried thereby form guards normally overlying the blades and preventing accidental contact of a worker with the rotating blades in the normal operating position of the parts shown in full lines in FIG. 4. The forwardly projecting parts 98 and 100 likewise constitute guards, but their skeleton form provides openings which permit an operator sitting upon the seat 20 to observe the ground and the growth of grass, weeds and brush immediately in advance of the cutter blades. Consequently, if the operator observes an obstruction, such as a stump or boulder in the path of the cutter blades, he can operate the controller for the power member 116 to elevate the pivoted mower blades and carrier to pass over the obstacle with clearance. The ground wheel 96 carried by the structure makes possible the positioning of the mower according to the contour of the surface being mowed, if that is desired. It will be understood, however, that the member 116 may be operated at all times to serve as a positive positioning means controlling the position of the pivoted arms 70.

The drive of the device from the power take-off 26 by means of the shaft 54 connected by universal joint 52 with the shaft 50 is positioned for convenient mounting and dismounting and for efficient operation.

It will be apparent that the entire device may be mounted upon a tractor by the simple expedient of securing the frame parts 32 and 44 to the chassis or motor block of the vehicle 10 as by cap screws 34 and 46, respectively, and by mounting bearing 56 for the shaft 54 upon the housing of the axle of the rear drive wheels. Hence the device can be preassembled as a unit and applied and removed as a unit. Thus the tractor or other vehicle is not limited in its use and can be employed for other purposes when not required for use in mowing by the simple expedient of disconnecting the cap screws 34 and 46 from the frame of the device and the securing means for mounting the bearing 56. Of course, it is also necessary to disconnect the drive-transmitting member 30 and to disconnect fluid means (not shown) leading from the vehicle to the power member 116. However, because of the wide range of pivotal movement of the mower, and ability to swing bar 70 to vertical position, as shown in dotted lines in FIG. 4, the vehicle can also be used for many purposes other than mowing without removing the mower therefrom.

While the preferred embodiment of the invention has been illustrated and described, it will be understood that changes in the construction may be made within the scope of the appended claims without departing from the spirit of the invention.

I claim:

1. A mower attachment for a power driven vehicle having a plurality of power take-off means, comprising a rigid frame adapted to be secured to and solely supported by said vehicle, a longitudinal shaft, means on said frame journaling said shaft, drive transmission means connecting said shaft to a power take-off means, a gear box having angularly extending journal members, one of said members being rotatably mounted on said shaft, an elongated rigid arm fixedly secured to said gear box substantially parallel to another journal member, a second gear box carried by said rigid arm intermediate its length and having angularly extending journal members, a second shaft driven by and extending at an angle to said first shaft and journaled in aligned journal members of said gear boxes, a cutter shaft driven by said second shaft journaled to said second gear box and extending at an angle to said rigid arm, a cutter carried by said cutter shaft, and power-actuated means carried by said frame for positioning said arm and adapted to be connected to a power take-off means.

2. A mower attachment for a power driven vehicle having a plurality of power take-off means, comprising a rigid frame adapted to be secured to and solely supported by said vehicle, a longitudinal shaft, means on said frame journaling said shaft, drive transmission means connecting said shaft to a power take-off means, a gear box having angularly extending journal members, one of said members being rotatably mounted on said shaft, an elongated rigid arm fixedly secured to said gear box substantially parallel to another journal member, a second gear box carried by said rigid arm intermediate its length and having angularly extending journal members, a second shaft driven by and extending at an angle to said first shaft and journaled in aligned journal members of said gear boxes, a cutter shaft driven by said second shaft journaled to said second gear box and extending at an angle to said rigid arm, a cutter carried by said cutter shaft, and power-actuated means carried by said frame for positioning said arm and adapted to be connected to a power take-off means, and a ground-engaging wheel carried by said arm spaced from said first gear box.

3. A mower attachment for a power driven vehicle having a plurality of power take-off means, comprising a rigid frame adapted to be secured to and solely supported by said vehicle, a longitudinal shaft, means on said frame journaling said shaft, drive transmission means connecting said shaft to a power take-off means, a gear box having angularly extending journal members, one of said members being rotatably mounted on said shaft, an elongated rigid arm fixedly secured to said gear box substantially parallel to another journal member, a second gear box carried by said rigid arm intermediate its length and having angularly extending journal members, a second shaft driven by and extending at an angle to said first shaft and journaled in aligned journal members of said gear boxes, a cutter shaft driven by said second shaft journaled to said second gear box and extending at an angle to said rigid arm, a cutter carried by said cutter shaft, power-actuated means carried by said frame for positioning said arm and adapted to be connected to a power take-off means, an elongated brace connected to said arm spaced from said first gear box, and a pivot mounting said brace and carried by said frame spaced forwardly from and aligned with said first shaft.

4. A mower attachment for a power driven vehicle having a plurality of power take-off means, comprising a rigid frame adapted to be secured to and solely supported by said vehicle, a longitudinal shaft, means on said frame journaling said shaft, drive transmission means connecting said shaft to a power take-off means, a gear box having angularly extending journal members, one of said members being rotatably mounted on said shaft, an elongated rigid arm fixedly secured to said gear box substantially parallel to another journal member, a second gear box carried by said rigid arm intermediate its length and having angularly extending journal members, a second shaft driven by and extending at an angle to said first shaft and journaled in aligned journal members of said gear boxes, a cutter shaft driven by said second shaft journaled to said second gear box and extending at an angle to said rigid arm, a cutter carried by said cutter shaft, power-actuated means carried by said frame for positioning said arm and adapted to be connected to a power take-off means, a lever pivoted to said frame above said arm on an axis parallel to said first shaft, arm suspending means carried by said lever and connected to said arm spaced from said first gear box, and power actuated lever pivoting means carried by said frame and adapted to be connected to a power take-off.

References Cited in the file of this patent

UNITED STATES PATENTS

| 2,603,929 | Newman | July 22, 1952 |
| 2,622,383 | Colvin | Dec. 23, 1952 |
| 2,709,881 | Goss | June 7, 1955 |
| 2,777,272 | Smith et al. | Jan. 15, 1957 |
| 2,952,961 | Engler | Sept. 20, 1960 |

FOREIGN PATENTS

| 215,508 | Australia | June 13, 1958 |